United States Patent
Kwong et al.

(10) Patent No.: US 7,385,811 B2
(45) Date of Patent: Jun. 10, 2008

(54) ULTRA MOBILITY DEVICE DESIGN TO OPTIMIZE SYSTEM COOLING AND FORM FACTOR

(75) Inventors: Wah Yiu Kwong, Beaverton, OR (US); Hong W. Wong, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 11/480,002

(22) Filed: Jun. 30, 2006

(65) Prior Publication Data

US 2008/0002356 A1    Jan. 3, 2008

(51) Int. Cl.
*G06F 1/20*  (2006.01)
*H05K 5/00*  (2006.01)
*H05K 7/20*  (2006.01)

(52) U.S. Cl. .................................................. 361/687

(58) Field of Classification Search ........ 361/680–697; 174/16.1, 16.3; 454/184
See application file for complete search history.

(56) References Cited

U.S. PATENT DOCUMENTS

| | | | | |
|---|---|---|---|---|
| 5,982,612 A | * | 11/1999 | Roylance | 361/680 |
| 6,556,430 B2 | * | 4/2003 | Kuo et al. | 361/680 |
| 2005/0213744 A1 | * | 9/2005 | Valli | 379/368 |
| 2006/0164799 A1 | * | 7/2006 | Varela | 361/680 |

* cited by examiner

*Primary Examiner*—Javaid H. Nasri
(74) *Attorney, Agent, or Firm*—Blakely, Sokoloff, Taylor & Zafman LLP

(57) ABSTRACT

According to one embodiment, a system is disclosed. The system includes a chassis, and a keyboard retractable from the chassis. When the keyboard is retracted at least partially from the chassis, it creates an empty space within the chassis for lowering air impedance of the system.

16 Claims, 5 Drawing Sheets

ULTRA MOBILITY DEVICE DESIGN TO OPTIMIZE SYSTEM COOLING AND FORM FACTOR

BACKGROUND

1. Field

Embodiments of the invention relate generally to computer systems and more specifically, but not exclusively, to enhancing thermal cooling within a mobility device.

2. Background Information

A mobile device is to be carried by a user and to be used while carried or when necessary. Thus, research has been concentrated on manufacturing mobile devices with a smaller form factor to make smaller and lighter mobile devices. However, if the mobile device is made smaller and lighter, the space in which the components are mounted becomes reduced, so that it is difficult to present an effective layout of the components. Further, in mobile devices providing multimedia and other functions (e.g., audio playback, video playback, etc.), considerable heat is generated from modules performing these functions. Thermal generation will continue to become more of a concern as overall system power continues to rise as a result of increasing complexity of the electronics and additional product features.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DETAILED DESCRIPTION

In the following description, numerous specific details are set forth to provide a thorough understanding of embodiments of the invention. One skilled in the relevant art will recognize, however, that embodiments of the invention can be practiced without one or more of the specific details, or with other methods, components, materials, etc. In other instances, well-known structures, materials, or operations are not shown or described in detail to avoid obscuring understanding of this description.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the following description and claims, the term "coupled" and its derivatives may be used. "Coupled" may mean that two or more elements are in direct contact (physically, electrically, magnetically, optically, etc.). "Coupled" may also mean two or more elements are not in direct contact with each other, but still cooperate or interact with each other.

Figure 1:
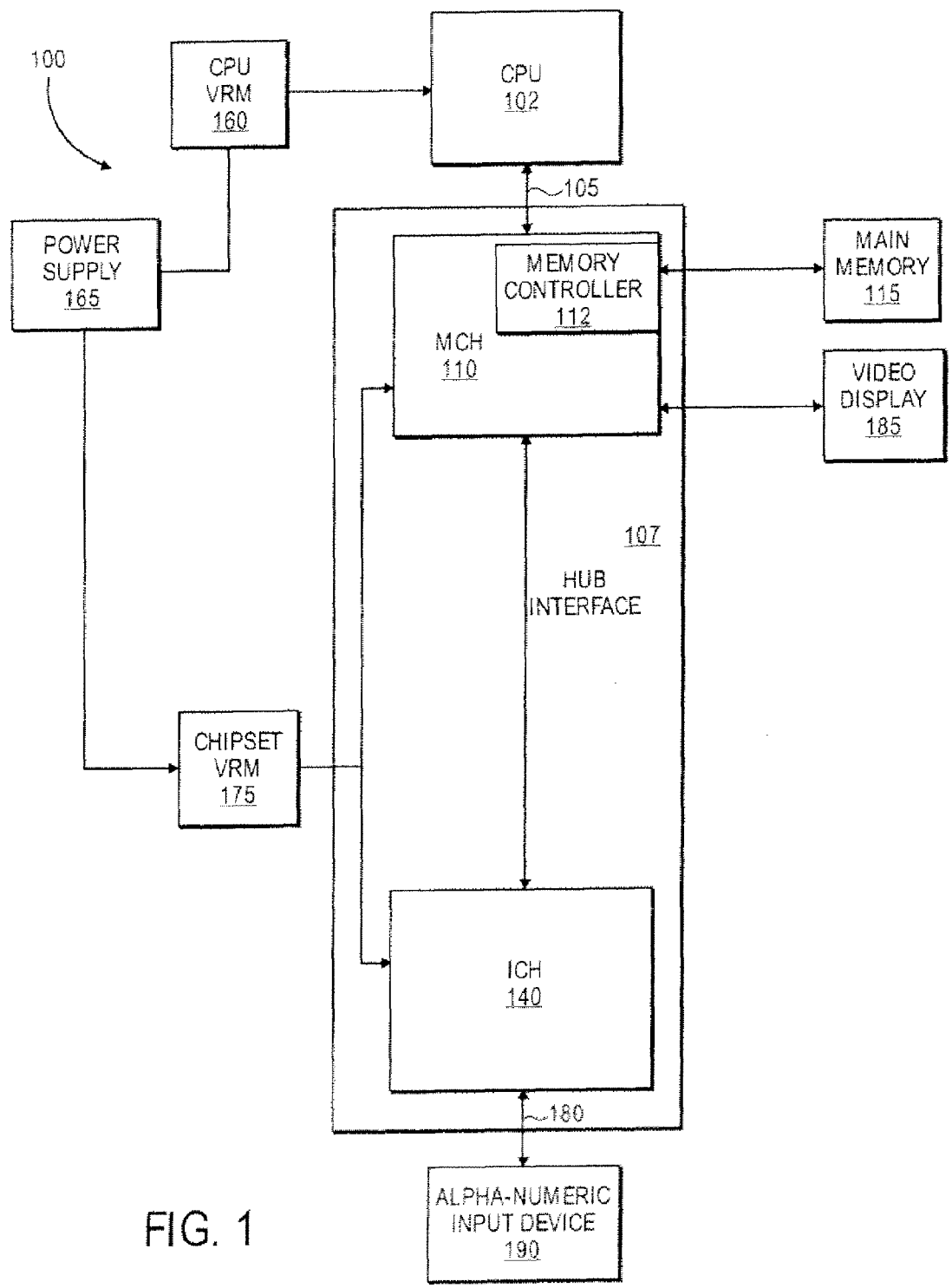
FIG. 1 is a block diagram of one embodiment of a computer system.

FIG. 1 is a block diagram of one embodiment of a computer system 100. According to one embodiment, computer system 100 is a mobile computing device such as a laptop or notebook computer (e.g., a low-power Intel® architecture (LPIA) platform mobile device, a multi-function hand held device, etc.).

Computer system 100 includes a central processing unit (CPU) 102 coupled to bus 105. In one embodiment, CPU 102 is a processor in the Pentium® family of processors including Pentium® IV processors available from Intel Corporation of Santa Clara, Calif. Alternatively, other CPUs may be used.

A chipset 107 is also coupled to bus 105. Chipset 107 includes a memory control hub (MCH) 110. MCH 110 may include a memory controller 112 that is coupled to a main system memory 115. Main system memory 115 stores data and sequences of instructions that are executed by CPU 102 or any other device included in system 100. In one embodiment, main system memory 115 includes dynamic random access memory (DRAM); however, main system memory 115 may be implemented using other memory types. Additional devices may also be coupled to bus 105, such as multiple CPUs and/or multiple system memories.

MCH 110 is coupled to a video display unit 185 (e.g., a liquid crystal display (LCD), a cathode ray tube (CRT), an organic light-emitting diode (OLED), etc.). MCH 110 is also coupled to an input/output control hub (ICH) 140 via a hub interface. ICH 140 provides an interface to input/output (I/O) devices within computer system 100. In particular, the ICH 140 is coupled, via bus 180, to an alpha-numeric input device 190 such as a keyboard (e.g., a PC keyboard, a chorded keyboard, an AlphaGrip® keyboard, etc.). As will be discussed in more detail below, the input device 190 is structured to enhance the thermal cooling of computer system 100.

In addition, computer system 100 includes a power supply 165 and a multitude of voltage regulators that are used to provide power to various components within computer system 100. In one embodiment, the power supply 165 is a DC power source that supplies DC voltage to computer system 100.

CPU voltage regulator module (VRM) 160 provides voltage to CPU 102. VRM 175 supplies voltage for both MCH 110 and ICH 140 within chipset 107.

As discussed above, computer system 100 is a mobile computing device such as a laptop or notebook computer. Examples of mobile computing devices may also include a cell phone, a personal digital assistant, or other similar device with on board processing power and wireless communications ability that is powered by a Direct Current (DC) power source that supplies DC voltage to the mobile device and that is solely within the mobile computing device and needs to be recharged on a periodic basis, such as a fuel cell or a battery.

Figure 2:
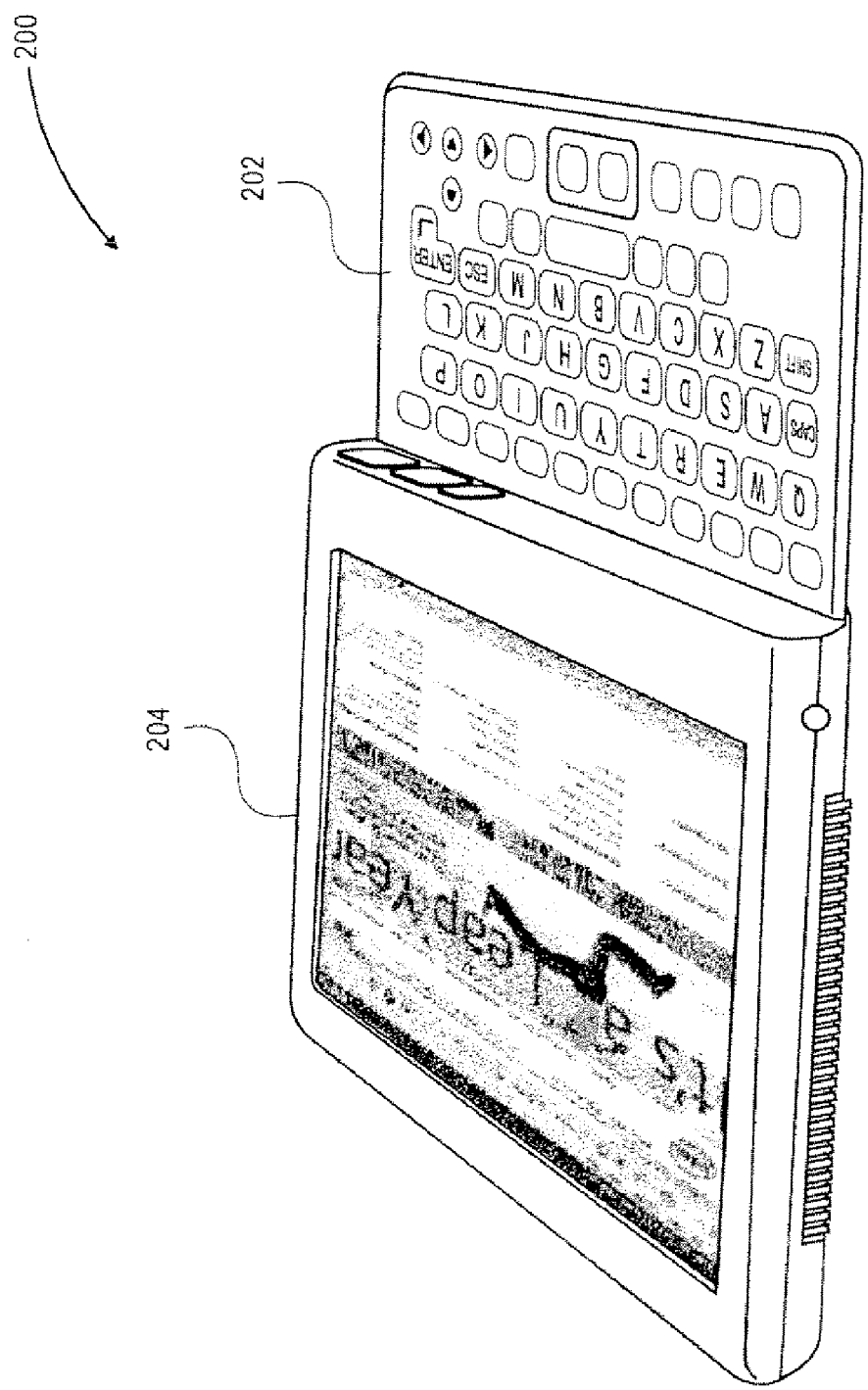
FIG. 2 illustrates a top view of one embodiment of a mobile computer system.

FIG. 2 illustrates a top view of one embodiment of a mobile computer system 200. Computer system 200 includes a chassis 204 that houses various units of computer system 200 including a processor, a memory, a power supply, a display unit, a keyboard, etc. A keyboard 202 is retractable, i.e., it can be positioned inside the chassis 204 or be partially or fully extracted from the chassis 204. The chassis 204 may contain an opening (e.g., a slot, a pocket, etc.) that holds the keyboard 202 and allows the keyboard to be retractable. In one embodiment, when the keyboard 202 is extracted at least partially from the chassis 204, an empty space is created within the chassis 204, which was occupied by the keyboard 202 prior to the extraction. This additional empty space lowers air impedance of computer system 200, enhancing the system thermal cooling.

In one embodiment, the chassis 204 includes side vents (e.g., ventilation holes or slots) to cool the air within computer system 200. When the keyboard 202 is fully extracted from the chassis 204, all the side vents are open for air intake and air exhaust. When the keyboard 202 is partially extracted from the chassis 204, only a part of the side vents that is no longer covered by the keyboard 202 due to its partial extraction becomes open for air intake and exhaust.

In one embodiment, the keyboard 202 has key caps that are separated from each other by valleys. When the keyboard 202 is positioned inside the chassis 204, the valleys between the key caps create channels for air flow. These channels allow the side vents to receive air intake and provide air exhaust, thus facilitating the thermal cooling of computer system 200.

In one embodiment, the chassis 204 also includes bottom vents to cool the air within computer system 200. When the keyboard 202 is fully extracted from the chassis 204, all the bottom vents are open for air intake and air exhaust. When the keyboard 202 is partially extracted from the chassis 204, a part of the bottom vents that is no longer covered by the keyboard 202 due to its partial extraction is open for air intake and exhaust. Hence, the partial and/or full extraction of the keyboard provide less restricted air flow, lowering the system's air impedance and enhancing the system cooling.

Figure 3:
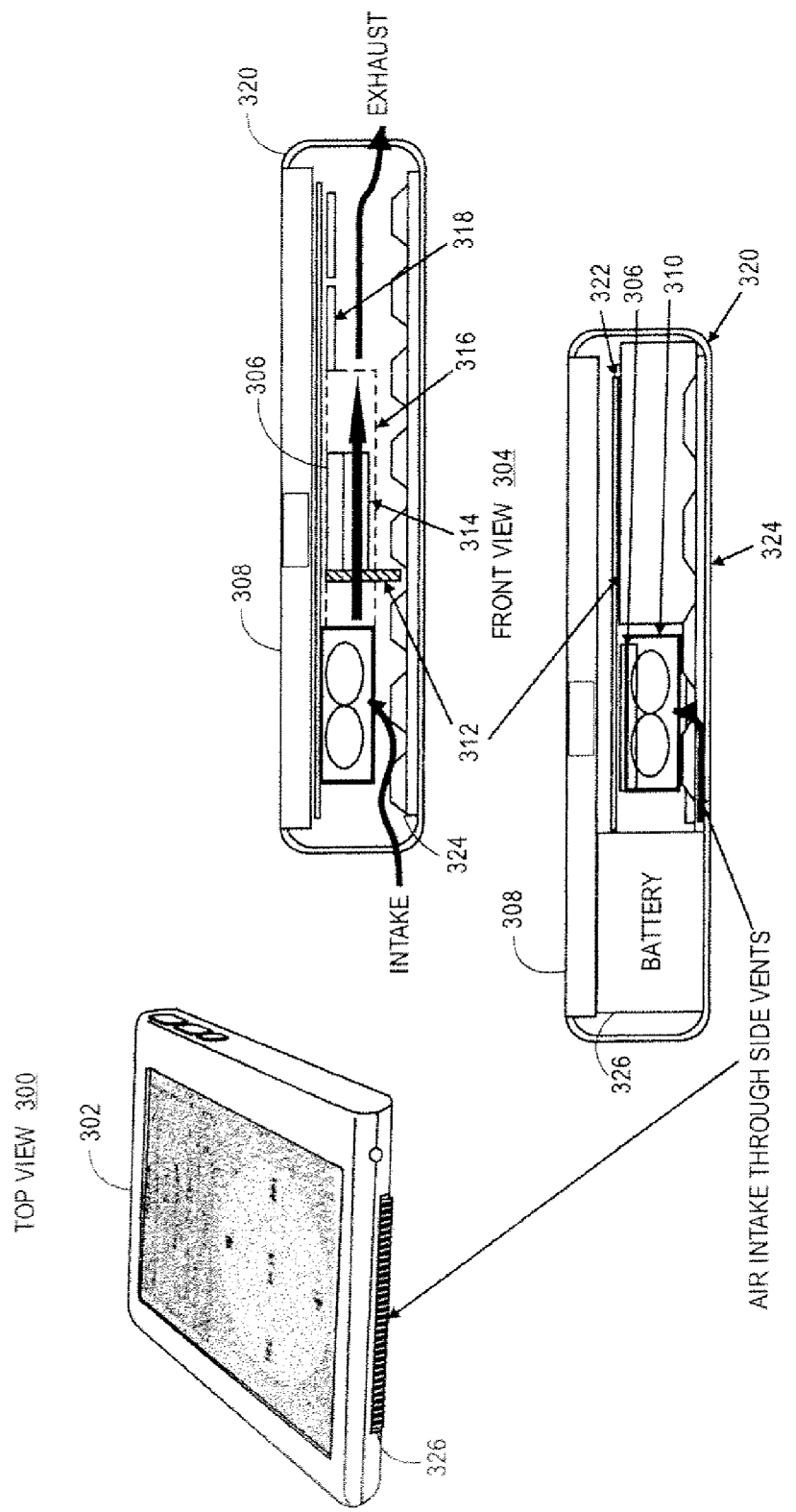
FIG. 3 illustrates one embodiment of the design of a mobile computer system in the closed state.

FIG. 3 illustrates one embodiment of the design of a mobile computer system in the closed state. Top view 300 shows a computer system 302 with a keyboard positioned internally under a display device. The computer system 302 contains side vents 326 for cooling the air inside the computer system 302. In one embodiment, the computer system 302 also contains bottom vents (not shown) for cooling the air inside the computer system 302.

Front view 304 and side view 330 show a chassis 320 that houses a display device 308 (e.g., LCD, CRT, OLED, etc.), a graphics engine 318, a central processing unit (CPU) 306, a printed circuit board (PCB) 322, a battery 326, and components for cooling the air inside the computer system 302. These components include a heat sink 314 for removing the heat from the CPU 306, a blower 310 for moving the air inside the chassis 320, and an air duct 316 for passing cooled air through the chassis 320. The air duct 316 includes an air intake chamber and an air exhaust chamber separated by a divider 312.

The chassis 320 also houses a keyboard 324. As shown, the keyboard 324 has key caps that are separated from each other by valleys. These valleys create channels for air flow, allowing the side vents 326 to receive air intake and provide air exhaust, thus facilitating the thermal cooling of the computer system 302.

Since the keyboard 324 is positioned inside the chassis 320, covering the bottom vents, air intake and exhaust thru the bottom vents is restricted.

Figure 4:
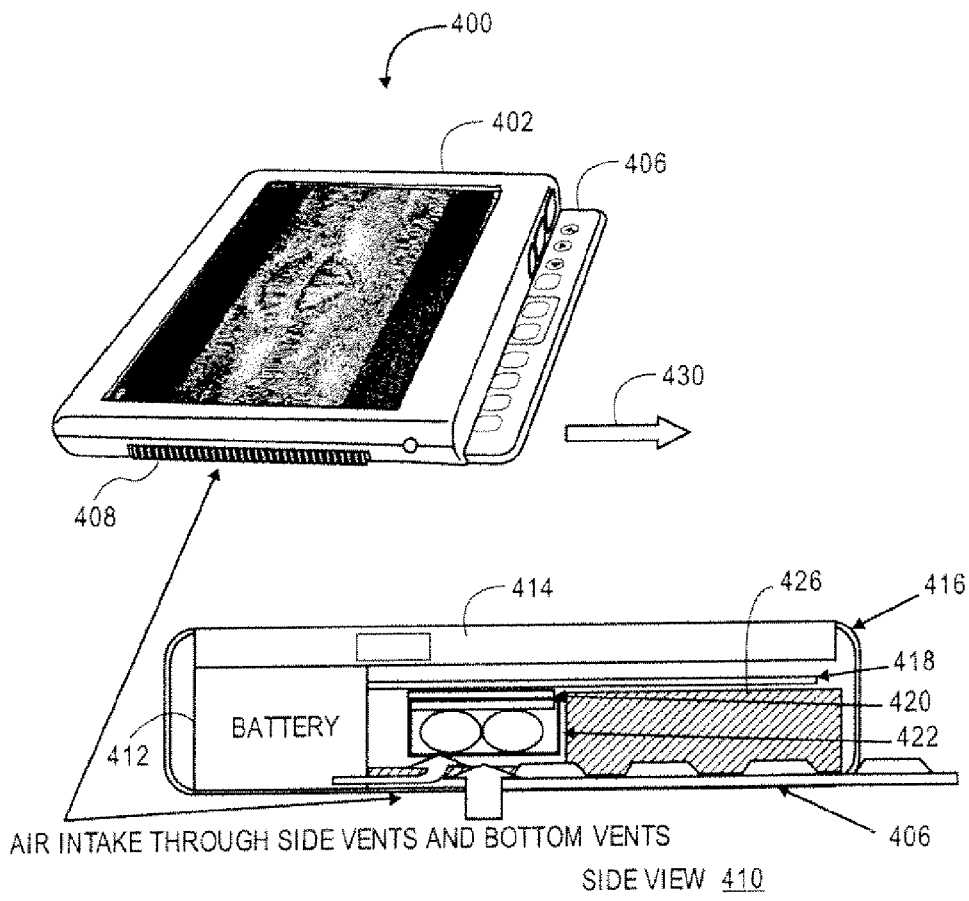
FIG. 4 illustrates one embodiment of the design of a mobile computer system in a partially open state.

FIG. 4 illustrates one embodiment of the design of a mobile computer system in a partially-open state. Top view 400 shows a computer system 402 with a partially-extracted keyboard 406. The computer system 402 contains side vents 406 for cooling the air inside the computer system 402. In one embodiment, the computer system 402 also contains bottom vents (not shown) for cooling the air inside the computer system 402.

Side view 410 show a chassis 416 that houses a display device 414 (e.g., LCD, CRT, OLED, etc.), a PCB 418, a CPU 420, a battery 412, a blower 422, a divider 426 for separating an air intake chamber and an air exhaust chamber of an air duct, and the keyboard 406. As discussed above, the keyboard 406 is partially extracted from the chassis 416. This partial extraction of the keyboard 406 opens up some bottom vents and some of the side vents 408, providing less restricted air flow and, thereby, lowering the system's air impedance.

Because the keyboard 406 is extracted from the chassis 416 only partially, some of the side vents 408 may be covered by the portion of the keyboard 406 that is positioned inside the chassis 416. The valleys between the key caps of the keyboard 406 allow those side vents to receive air intake and provide air exhaust, thus enhancing the system cooling.

As compared to the thermal design of the computer system in the closed state as illustrated in FIG. 3, the thermal design of the computer system in the partially open state (FIG. 4) is more efficient because of the internal empty space created by the partial extraction of the keyboard. Hence, in one embodiment, the computer system in the closed state may run low-power applications (e.g., MP3 playback) while the computer system in the partially open state may run higher power applications (e.g., video playback).

Figure 5:
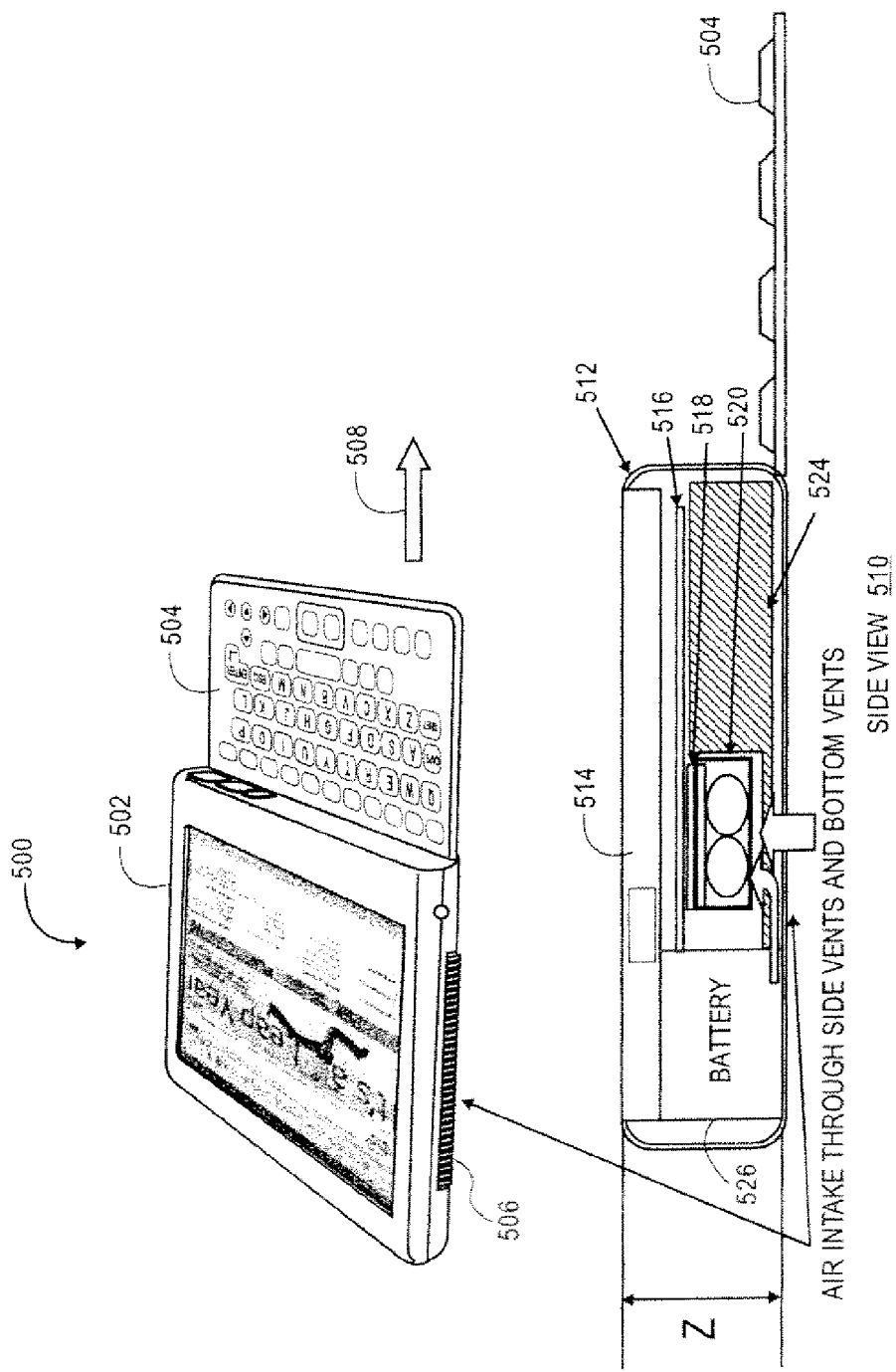
FIG. 5 illustrates one embodiment of the design of a mobile computer system in the open state.

FIG. 5 illustrates one embodiment of the design of a mobile computer system in the open state. Top view 500 shows a computer system 502 with a fully extracted keyboard 504. The computer system 502 contains side vents 506 for cooling the air inside the computer system 502. In one embodiment, the computer system 502 also contains bottom vents (not shown) for cooling the air inside the computer system 502.

Side view 510 show a chassis 512 that houses a display device 514 (e.g., LCD, CRT, OLED, etc.), a PCB 516, a CPU 518, a battery 526, a blower 520, and a divider 524 for separating an air intake chamber and an air exhaust chamber of an air duct. The keyboard 504 is fully extracted from the chassis 512. This extraction of the keyboard 504 opens up all bottom vents and side vents 506, providing unrestricted air flow and, thereby, lowering the system's air impedance.

As compared to the thermal design of the computer system in the closed state as illustrated in FIG. 3 and the thermal design of the computer system in the partially open state as illustrated in FIG. 4, the thermal design of the computer system in the fully open state is the most efficient, and therefore allows for the execution of higher power applications.

As discussed above, the retractability of the keyboard 504 and its structure (separation of key caps by valley) lowers the system's air impedance and enhances the system cooling. As a result, in one embodiment, the clearance above the blower 520 is reduced (as compared to the traditional design methodology), and consequently the overall height Z of the computer system 502 can be reduced. Furthermore, in one embodiment, because of the lowered air impedance, the blower 520 uses a smaller fan and/or is smaller in size. In addition, the blower 520 may have a smaller and/or thinner impeller and/or be thinner in "Z" dimension. The reduction of the overall height of the computer system and the above-mentioned changes of the blower 520 provide for lower acoustics, slimmer form factor, lower system power drawn by the fan, and/or lower cost of the fan and/or the blower.

The above description of illustrated embodiments of the invention, including what is described in the Abstract, is not intended to be exhaustive or to limit the embodiments to the precise forms disclosed. While specific embodiments of, and examples for, the invention are described herein for illustrative purposes, various equivalent modifications are possible, as those skilled in the relevant art will recognize. These modifications can be made to embodiments of the invention in light of the above detailed description. The terms used in the following claims should not be construed to limit the invention to the specific embodiments disclosed in the specification. Rather, the following claims are to be construed in accordance with established doctrines of claim interpretation.

What is claimed is:

1. A system comprising:
    a chassis; and
    a keyboard retractable from the chassis, the keyboard comprising a plurality of key caps separated from each other by valleys,
    wherein the keyboard, when retracted at least partially from the chassis, creates an empty space within the chassis, the empty space and the valleys facilitating lowering of air impedance of the system, and wherein the chassis comprises side vents for air intake and air exhaust, and the valleys between the key caps create channels for air flow through the side vents when the keyboard is positioned at least partially inside the chassis.

2. The system of claim 1 wherein, when the keyboard is partially extracted from the chassis, the air flow for a first portion of the side vents occurs due to the valleys and the air flow for a second portion of the side vents occurs due to an opening created by the partial extraction of the keyboard.

3. The system of claim 1 wherein, when the keyboard is fully extracted from the chassis, the air flow for the side vents occurs due to an opening created by the extraction of the keyboard.

4. The system of claim 1 wherein:
    the chassis further comprises bottom vents for air intake and air exhaust, the bottom vents having no air flow when the keyboard is positioned inside the chassis.

5. The system of claim 4 wherein:
    when the keyboard is partially extracted from the chassis, the air flow for a portion of the bottom side vents occurs due to an opening created by the partial extraction of the keyboard; and
    when the keyboard is fully extracted from the chassis, the air flow for the bottom side vents occurs due to an opening created by the full extraction of the keyboard.

6. The system of claim 5 further comprising a processing device running low power applications when the keyboard positioned inside the chassis and higher power applications when the keyboard is extracted from the chassis.

7. A system comprising:
    a chassis;
    a keyboard retractable from the chassis, the keyboard comprising a plurality of key caps separated from each other by valleys, wherein the keyboard, when retracted at least partially from the chassis, creates an empty space within the chassis, the empty space and the valleys facilitating lowering of air impedance of the system; and
    a blower that has a reduced clearance above therefrom, the reduced clearance being allowed by the created empty space within the chassis due to the extraction of the keyboard.

8. The system of claim 7 wherein the blower has a smaller and/or thinner impeller due to the lowered air impedance of the system.

9. A mobile device comprising:
    a processor;
    a display device coupled to the processor; and
    a keyboard coupled to the processor, the keyboard having a plurality of key caps separated from each other by valleys that create channels for air flow within the mobile device,
    wherein the keyboard is retractable to create, when retracted at least partially, an empty space within the mobile device for lowering air impedance of the mobile device, and when the keyboard is in a close state, the valleys between the key caps create channels for air flow through side vents of the mobile device.

10. The device of claim 9 wherein, when the keyboard is in a partially open state, the air flow for a first portion of the side vents occurs due to the valleys and the air flow for a second portion of the side vents occurs due to an opening created by a partial extraction of the keyboard.

11. The device of claim 9 wherein, when the keyboard is in an open state, the air flow for the side vents occurs due to an opening created by a full extraction of the keyboard.

12. The device of claim 9 further comprising bottom vents for air intake and air exhaust, the bottom vents having no air flow when the keyboard is in the closed state.

13. The device of claim 12 wherein:
    when the keyboard is in the partially open state, the air flow for a portion of the bottom side vents occurs due to an opening created by a partial extraction of the keyboard; and
    when the keyboard is in the open state, the air flow for the bottom side vents occurs due to an opening created by a full extraction of the keyboard.

14. The device of claim 13 wherein the processor runs low power applications when the keyboard is in the closed state and higher power applications when the keyboard is in the partially open state or the open state.

15. A mobile device comprising:
    a processor;
    a display device coupled to the processor;
    a keyboard coupled to the processor, the keyboard having a plurality of key caps separated from each other by valleys that create channels for air flow within the mobile device,
    wherein the keyboard is retractable to create, when retracted at least partially, an empty space within the mobile device for lowering air impedance of the mobile device; and
    a blower that has a reduced clearance above therefrom, the reduced clearance being allowed by the empty space created when the keyboard is extracted at least partially.

16. The device of claim 15 wherein the blower has a smaller and/or a thinner impeller due to the lowered air impedance of the system.

* * * * *